(No Model.)
L. WAGNER.
WINE SCHOENER.
No. 439,755. Patented Nov. 4, 1890.
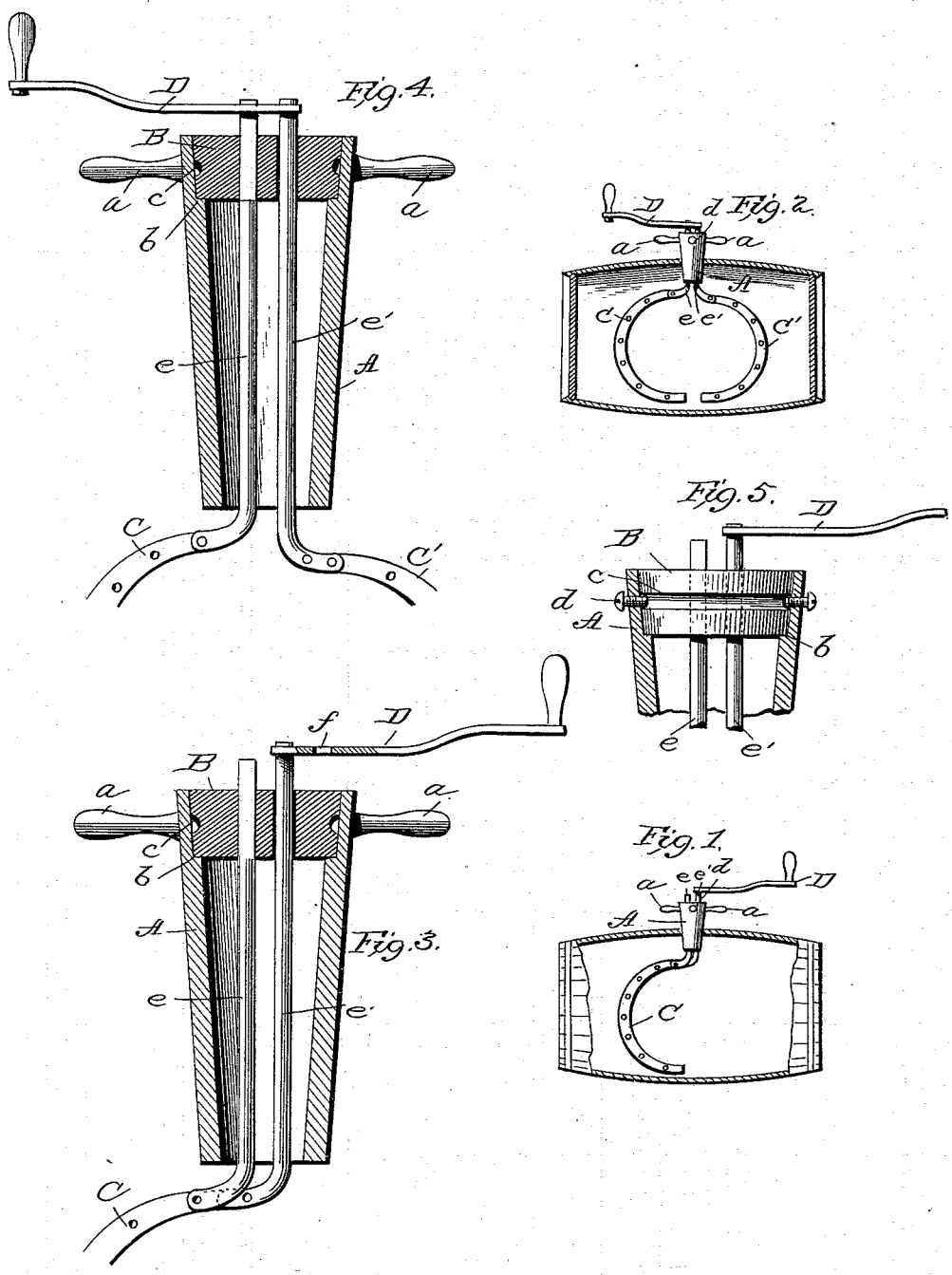
Attest
Walter Donaldson
F. L. Middleton
Inventor
Ludwig Wagner
by Spear & Suly
Attys

UNITED STATES PATENT OFFICE.

LUDWIG WAGNER, OF SAN FRANCISCO, CALIFORNIA.

WINE-SCHOENER.

SPECIFICATION forming part of Letters Patent No. 439,755, dated November 4, 1890.

Application filed May 9, 1890. Serial No. 351,173. (No model.)

*To all whom it may concern:*

Be it known that I, LUDWIG WAGNER, a citizen of the United States, residing at the city and county of San Francisco, State of California, have invented certain new and useful Improvements in Wine-Schoeners; and I do hereby declare that the following is a full, clear, and exact description of the same.

My invention relates to an instrument for stirring and mixing wine in casks previously to allowing it to settle. When the cask is filled, the wine is more or less muddy, and certain clarifying substances are introduced into it which must be thoroughly stirred and mixed with the wine before being allowed to settle. The cask being headed tightly, and its interior accessible only by the bung-hole, it has been found difficult to accomplish this mixing and stirring satisfactorily.

The object of my invention is to produce an implement that can be easily inserted into the cask through the bung-hole and then be operated to produce the required agitation of the contents of the cask. The process of mixing is known in the art as "schoening," and the implement is called by the trade a "wine-schoener."

Briefly described, my improved implement consists in a pair of curved or sickle-shaped blades, which, when brought into line with one another, will readily enter the bung-hole; but when in place are so turned that their curves will oppose each other. These blades are mounted so that they may be caused to revolve in either direction within the cask to effect the agitation of the contents.

For a full comprehension of my invention reference must be made to the accompanying drawings, in which—

Figure 1 is a sectional view of a cask, showing the blades in their closed position, as when introduced into the cask. Fig. 2 is a similar view showing the blades opened out or expanded. Fig. 3 is an enlarged sectional view of the hollow cone plug which supports the blades, the latter being shown as closed. Fig. 4 is a similar view with the blades opened. Fig. 5 is a detail view of the swiveled block which supports the blades.

In the drawings, A represents a hollow tapering metallic plug adapted to be inserted into the bung-hole of a barrel and provided with handles $a\ a$, by which it is forced into the cask. On its inner face and near the top it is formed with a shoulder $b$ upon which bears a swiveled block B, having a peripheral groove $c$. The block is prevented from upward movement by screws $d$, which pass through the shell of the plug A and enter the groove without binding therein, so that the block may rotate freely within the plug. Passing through the block B are the straight shanks $e\ e'$ of the curved blades C C', the blades being preferably secured to the shanks, as shown, but being formed as a part of them, if preferred. The shank of the blade C, which is squared where it passes through the block, is firmly secured to the block by soldering or otherwise, while that of the blade C' turns freely within it, and the shank $e'$ is made a little longer than the other, Fig. 4, in order to permit a slight vertical movement. The loose blade C' is provided with a crank-handle D, having a squared hole $f$. The blade C' may therefore be raised and turned, and the hole $f$ brought down around the squared end of blade C, locking both blades together and to the block, in position shown in Figs. 2 and 4. In the position shown in Figs. 1 and 3, however, the blades are brought together and can then be inserted into the bung-hole. Each blade is preferably provided with a series of holes $g$, through which the wine rushes when the blades are revolved, thus assisting to some extent in the agitation.

In operating the device the blades are closed together, and by reason of their curvature are easily inserted into the cask. The plug is then forced into the bung-hole, the loose blade raised, turned, and locked to the fixed blade, and both blades are rapidly revolved by the crank, thoroughly mixing and agitating the contents of the cask. The removal of the implement is of course the converse of the operation just described.

What I claim is—

1. An implement for agitating the liquid contents of a cask, consisting of a hollow plug adapted for insertion in the bung-hole, a rotary block swiveled in such plug, and a pair of agitating-blades, one fixed to such block and the other movable therein but capable of being locked to the fixed blade, substantially as set forth.

2. The combination of a hollow plug adapted for insertion in the bung-hole of a cask, of a swiveled block supporting a fixed blade and a loose blade, a crank-handle on the loose blade, and in said crank-handle a locking-hole for locking the blades together, substantially as set forth.

LUDWIG WAGNER.

Witnesses:
 F. O. WEGENER,
 J. S. FITZGERALD.